United States Patent
Loew et al.

(10) Patent No.: US 10,173,634 B2
(45) Date of Patent: Jan. 8, 2019

(54) SEAT MOUNTED ADJUSTABLE SEAT BELT WEBBING GUIDE

(71) Applicant: Ford Global Technologies, LLC, Dearborn, MI (US)

(72) Inventors: Pattrick Loew, Dearborn, MI (US); Benjamin Yilma, Canton, MI (US); Travis Justin Raines, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/190,523

(22) Filed: Jun. 23, 2016

(65) Prior Publication Data
US 2017/0369029 A1 Dec. 28, 2017
US 2018/0208149 A9 Jul. 26, 2018

(51) Int. Cl.
*B60R 22/20* (2006.01)
*B60R 22/26* (2006.01)
*B60R 22/18* (2006.01)

(52) U.S. Cl.
CPC .............. *B60R 22/20* (2013.01); *B60R 22/26* (2013.01); *B60R 2022/1818* (2013.01)

(58) Field of Classification Search
CPC . B60R 22/20; B60R 22/26; B60R 2022/1818; B60R 2022/1843
See application file for complete search history.

(56) References Cited

U.S. PATENT DOCUMENTS

| 5,263,741 | A  | * | 11/1993 | Seros ................... B60R 22/024 280/808 |
| 5,730,499 | A  |   | 3/1998 | Salisbury, Jr. |
| 5,897,169 | A  |   | 4/1999 | Larsen et al. |
| 5,979,991 | A  |   | 11/1999 | Lewandowski et al. |
| 6,749,223 | B2 | * | 6/2004 | Kazuo .................... B60R 22/20 280/727 |
| 6,880,893 | B1 |   | 4/2005 | Scotton |
| 7,618,097 | B2 | * | 11/2009 | Ghatge .................. B60R 22/26 297/473 |
| 7,971,908 | B2 | * | 7/2011 | Hathaway ............... B60R 22/26 24/115 F |
| 8,646,845 | B2 |   | 2/2014 | Varcus |
| 2006/0119092 | A1 |   | 6/2006 | Downey |

FOREIGN PATENT DOCUMENTS

| EP | 1514748 A1 | 3/2005 |
| EP | 1918164 B1 | 7/2009 |
| EP | 2001714 B1 | 8/2015 |
| EP | 2923897 A1 | 9/2015 |

* cited by examiner

*Primary Examiner* — Philip F Gabler
(74) *Attorney, Agent, or Firm* — Vichit Chea; Price Heneveld LLP

(57) ABSTRACT

A webbing guide for a vehicle seat includes a base defining a length between a first end and a second end and a guide body coupled with the base and defining a guide channel extending at least partially along a length of the base. A first end of the guide channel is disposed adjacent the first end of the body and is moveable toward and away from the second end of the body.

20 Claims, 5 Drawing Sheets

SEAT MOUNTED ADJUSTABLE SEAT BELT WEBBING GUIDE

FIELD OF THE INVENTION

The present invention generally relates to a webbing guide for a seatbelt associated with a vehicle seat. In particular, the webbing guide includes a guide body with a moveable end to adjust a position of the webbing with respect to the seat.

BACKGROUND OF THE INVENTION

The widely varying sizes and body-types of vehicle seat occupants can result in seatbelts associated with such vehicle seats contacting the use at varying points along the user's body. In some instances, particularly with respect to shorter occupants, the webbing positioning can cause uncomfortable contact with the seat occupant's neck. Other undesirable positions are also possible based on particular webbing and set configuration, as well as specific physical aspects of the seat occupant.

Various assemblies for achieving particular positioning of a seatbelt webbing with respect to the associated vehicle seat are available. In particular, some such positioning assemblies include a vertically moveable D-ring or other such assembly for moving an upper anchoring point of the webbing vertically up and down along the B-pillar of the associated vehicle. Other assemblies include various fixed guides or pass-throughs on the vehicle seat itself. Notably, such assemblies either fail to adjust the webbing positioning at all or do not directly address the issue of lateral positioning of the webbing on the user. Accordingly, further improvements are desired.

SUMMARY OF THE INVENTION

According to one aspect of the present invention, a webbing guide for a vehicle seat includes a base defining a length between a first end and a second end and a guide body coupled with the base and defining a guide channel extending at least partially along a length of the base. A first end of the guide channel is disposed adjacent the first end of the body and is moveable toward and away from the second end of the body.

According to another aspect of the present invention, a vehicle seat includes a seatback and a webbing guide. The webbing guide includes a base coupled with the seatback and defining a length between a first end and a second end and a guide body coupled with the base and defining a guide channel extending along a length of the base. A first end of the guide channel is moveable along at least a portion of the length of the base.

According to another aspect of the present invention, a vehicle includes a vehicle seat coupled within the vehicle and including a seatback. The vehicle further includes a webbing coupled with the vehicle and associated with the vehicle seat and a webbing guide. The webbing guide has a base coupled with the seatback and defining a length between a first end and a second end and a guide body coupled with the base and defining a guide channel extending along a length of the base and receiving the webbing therethrough. A first end of the guide channel is moveable along at least a portion of the length of the base to adjust a position of the webbing with respect to at least a portion of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
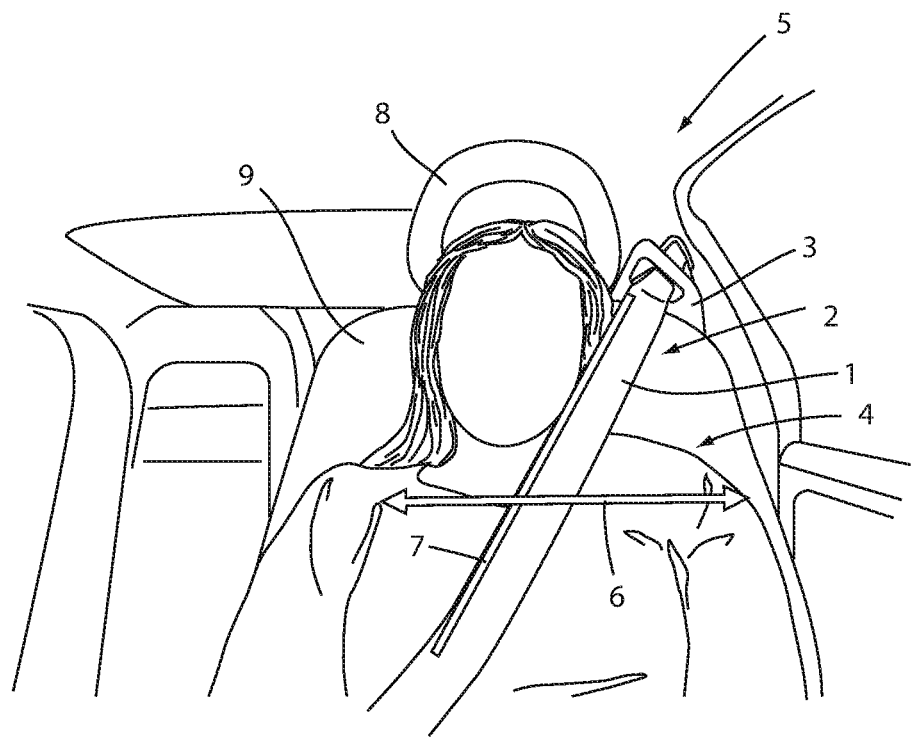
FIG. 1 is a front perspective of a related-art vehicle seat having an occupant and showing a possible positioning of an associated seatbelt webbing with respect to the occupant.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 3:
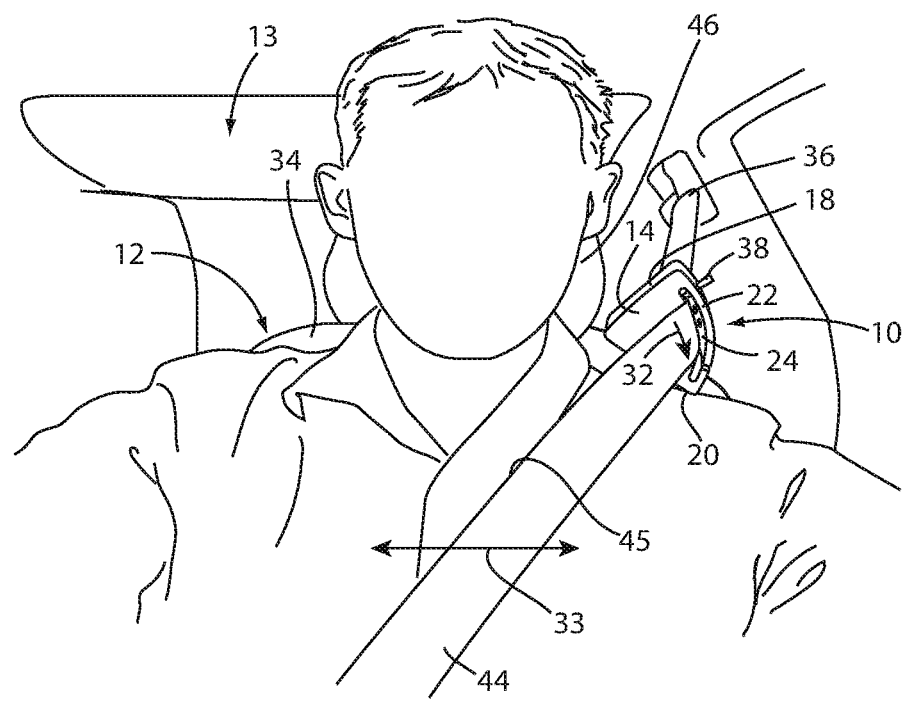
FIG. 3 is a front perspective view of a vehicle seat having an occupant and showing a possible positioning of an associated seatbelt webbing with respect to the occupant, as provided by the webbing guide of FIG. 2.

Referring to FIG. 1, reference numeral 10 generally designates a webbing guide for a vehicle seat 12 (FIG. 3). Webbing guide 10 includes a base 14 defining a length 16 between a first end 18 and a second end 20. Webbing guide 10 further includes a guide body 22 coupled with the base 14 and defining a guide channel 24 extending at least partially along the length 16 of base 14. A first end 18 of the guide channel 24 is moveable toward and away from the second end 20 of base 14.

As shown in FIG. 3, webbing guide 10 may be coupled with a vehicle seat 12 that includes a seatback 28 and can be used to adjust the path of a webbing 44 corresponding with vehicle seat 12. As further shown in FIG. 3, webbing guide 10 can be coupled with seatback 28 and can be positioned such that the above-mentioned movement of first end 26 of guide channel 24 can be used to adjust the positioning of webbing 44, including the related positioning of an edge 45 thereof with respect to an adjacent headrest 46. It is further noted that such adjustment may allow a user to adjust the positioning of the webbing 44 and the corresponding edge 45 to a desired position with respect to the user to, for example, provide increased comfort for the user by moving edge 45 away from the user's neck.

As shown in the related-art depiction in FIG. 1, the size, particularly the height, of a user or occupant of vehicle seat 2 without an adjustable webbing guide can result in uncomfortable or otherwise disadvantageous positioning of an edge 7 of seatbelt webbing 1 with respect to the user's neck and/or head. As illustrated in FIG. 1, even vehicle seat 2 arrangement that includes a fixed webbing guide 3 thereon may still position webbing 1 in a position that causes uncomfortable interaction with various portions of the user's body, including the neck and head. This can be particularly pronounced when the user's head is positionable below the headrest 8 of vehicle seat 2, as illustrated, the webbing guide 3 being at a fixed position with respect to headrest 8.

Figure 4:
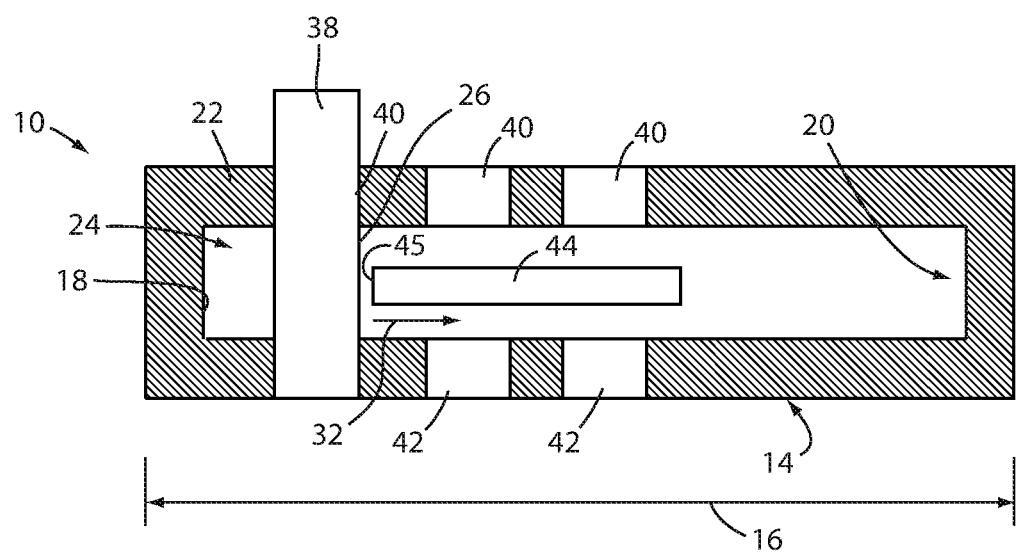
FIG. 4 is a schematic view showing an adjustment mechanism of the webbing guide of FIG. 2.

Accordingly, by providing the webbing guide 10, described herein, a position of webbing 44 can be adjusted with respect to headrest 46, per the desires of the occupant of seat 12. As depicted in FIG. 4, the above-described first end 26 of guide channel 24 can be defined on a pin 38 that can be selectively and removeably received in one of a plurality of holes 40 within and distributed along guide body 22, including at regular intervals therealong, so as to be moveably disposed with respect thereto. As shown, the first end 26 of guide channel 24 defined on pin 38 can be a side of pin 38 adjacent to edge 45 of webbing 44 such that first end 26 can limit the lateral movement of webbing 44 within guide channel 24 (i.e. in direction 32, as indicated in FIG. 3). In this manner the user, by repositioning pin 38 among the available holes 40 can change a lateral limit of the travel of webbing 44 within guide channel 24. As further shown in FIG. 3, the positioning of webbing guide 10 on seatback 28 can be such that when webbing 44 is received within guide channel 24 it is moved away from headrest 46 in lateral direction 33 from its natural position with respect thereto. In this manner, the tension of webbing 44 applied by the seatback mechanism associated therewith can maintain edge 45 of webbing 44 in general contact with edge 45 of guide channel 24, as defined by pin 38.

In this manner, the user can change the positioning of webbing in directions 32 and 33 by appropriately assembling pin 38 within a desired one of holes 40 with webbing 44 positioned on a laterally outward side thereof (i.e. away from headrest 46). As shown in FIG. 4, pin 38 is assembled with one of holes 40 that is closest to first end 18 of base 14 such that webbing 44 is moved outwardly away from headrest 46 at a position relatively closer to headrest 46 than provided by the reaming ones of holes 40. It is noted that a further lateral position closer yet to headrest 46 can be provided by removing pin 38 and allowing edge 45 of webbing 44 to contact and end of guide channel 24 adjacent to first end 18 of base 14, such that first end 26 of guide channel 24 is defined by the end of guide channel 24. As further shown in FIG. 2, guide body 22 can include a slot 30 therein to allow removal of webbing 44 therefrom. This can be advantageous to allow aftermarket assembly of webbing guide 10 with a vehicle seat 12, or to allow a user to remove webbing 44 from webbing guide 10 such that webbing 44 can be in its natural position. In the embodiment depicted in FIG. 3, as well as in other embodiments described herein, such a slot may be omitted such that the webbing 44 is generally permanently received within guide channel 24.

As further shown in FIG. 4, a series of secondary holes 42 can be positioned within base 14 so as to be generally aligned with holes 40 such that when pin 38 is assembled with webbing guide 10 it engages with one of holes 40 and the corresponding one of secondary holes 42 to provide stability for the assembly of pin 38 with webbing guide 10. In one aspect, pin 38 may form a press-fit engagement with holes 42, while generally freely passing through holes 40 to aid in assembly and retention thereof with webbing guide 10.

Figure 2:
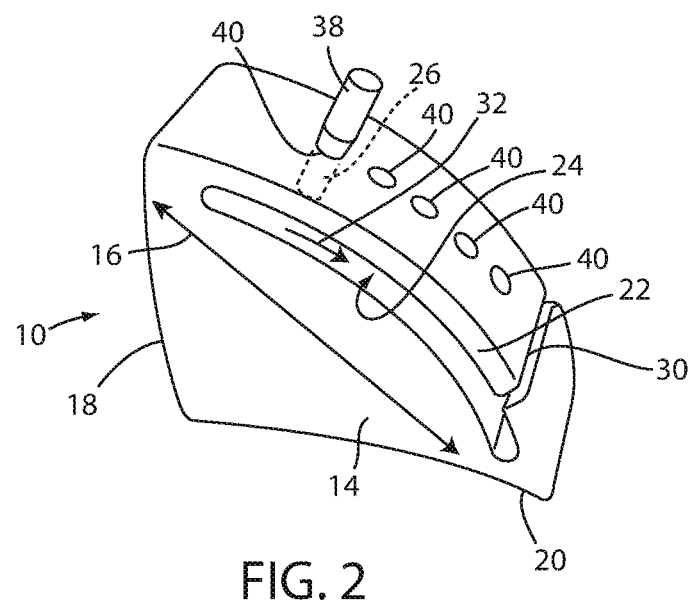
FIG. 2 is a front perspective view of a seatbelt webbing guide according to an aspect of the disclosure.
Figure 5:
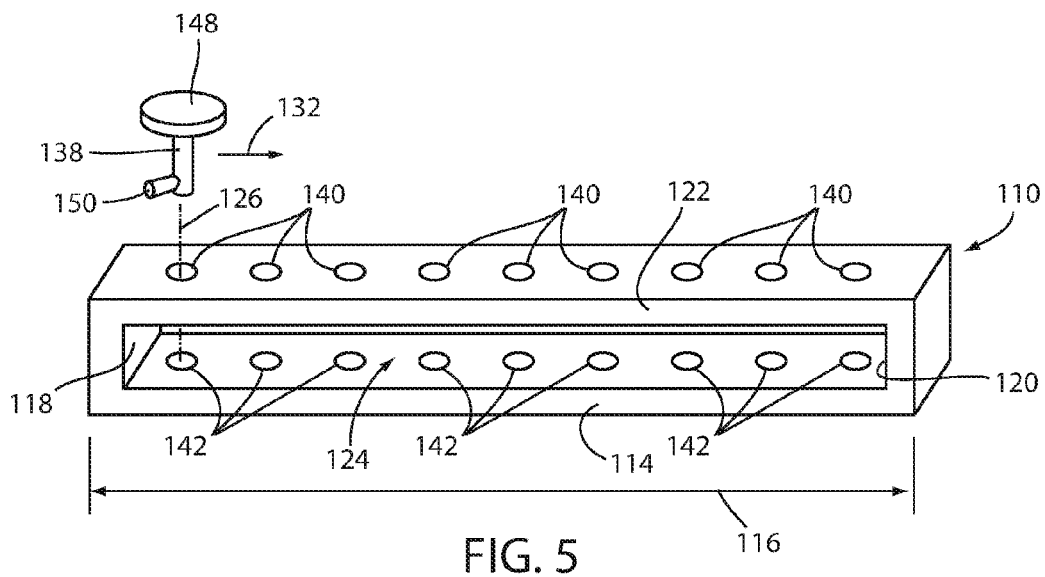
FIG. 5 is a front perspective assembly view of a variation of a webbing guide according to another aspect of the disclosure.
Figure 6:
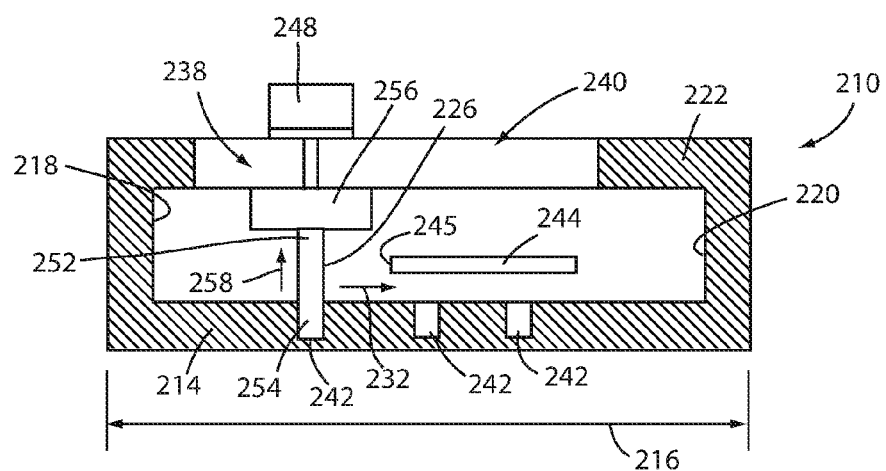
FIG. 6 is a front cross-section view of another variation of a webbing guide according to a further aspect of the disclosure.
Figure 7:
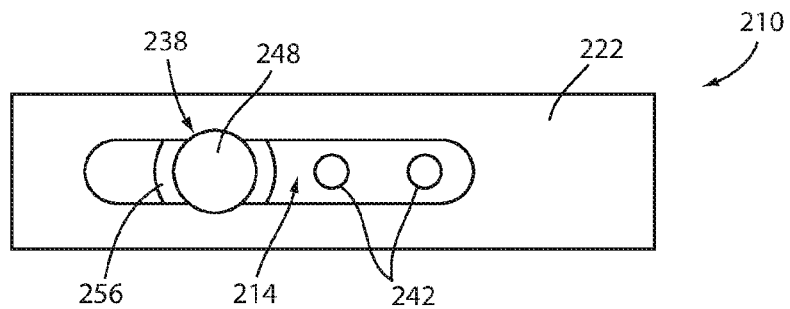
FIG. 7 is a top view of the webbing guide of FIG. 6.

It is noted that the depiction of webbing guide 10 in FIG. 4 is schematic in nature and reflects the overall construction of webbing guide 10 as illustrated in FIG. 2 in a conceptual manner, particularly with respect to the shape and configuration of guide channel 24, which is shown in FIG. 2 as extending in an arcuate manner. For sake of simplicity of illustration, the depiction of webbing guide 10 in FIG. 4, as well as FIGS. 5-7 are depicted with guide channel 24 extending in a generally straight manner, and with portions of base 14 omitted for clarity of illustration. It is noted that, further, any of the additional embodiments shown in FIGS. 5-7, as described further below, as well as FIG. 4, can be adapted to be configured as shown in FIG. 2 or in other configurations developed to match the geometry of seatback 28, headrest 46, as well as the location of other features associated with webbing 44 including the location of a D-ring 36 or other anchoring structures.

Turning now to FIG. 5 a further variation of the above-described webbing guide is illustrated. In particular, webbing guide 110 includes a further plurality of aligning holes 140 and secondary holes 142 adapted to receive pin 138 in various locations along guide channel 124 to establish an end 126 of guide channel 124 at varying positions with respect to second end 120 of base 114. As illustrated, pin 138 may include a pull tab 148 along an upper portion thereof to assist a user in grasping pin, for example, for removal of pin 138 from hole 140. Further, pin 138 is illustrated with a snap feature 150 disposed at an end thereof opposite tab 148. In one aspect, snap feature 150 can be a spring tab that can be outwardly biased, such as into the position shown in FIG. 5. Secondary holes 142 can be configured to accept snap feature 150 therethrough, under compression thereof, while allowing snap feature 150 to return to its outwardly-biased position upon assembly with secondary holes 142. This arrangement can, accordingly, provide for additional retentive force of pin 138 with guide body 122, to prevent, for example, intentional removal of pin.

FIGS. 6 and 7 show a further variation of webbing guide 210 that includes a generally permanently assembled pin 238 with respect to guide body 222, pin 238 being a spring pin retained within a slot 240 extending along a portion of the length 216 of base 214 such that pin 238 is slidable with respect thereto in an adjustment direction 232 along a portion of guide channel 224. In this embodiment, pin 238 can be configured with a pull tab 248 at an upper end thereof and disposed outside of guide body 222 for access thereto by a user. Further, pin 238 can include a flange 256 received within guide channel 224 and oversized with respect to slot 240 such that flange 256 serves to retain pin 238 in assembly with guide channel 224. A lower portion 252 of pin 238 extends away from flange 256 opposite of pull tab 248 such that an end 254 of pin defined thereon is selectively engageable with one of secondary holes 242 positioned opposite guide channel 224 from slot 240. In an arrangement, lower portion 252 may be integrally or otherwise joined with pull tab 248 and may, further, be spring biased in a direction away from flange 256 in a direction opposite slot 240 such that, when aligned with one of secondary holes 242, lower portion 252 is urged downwardly and into engagement therewith. Such a biasing force also serves to retain flange 256 in an engaged manner with an interior of guide channel 224 adjacent slot 240.

In this arrangement, if a user desires to adjust the positioning of first end 226 of guide channel 224, the user may pull upwardly in direction 258 on pull tab 248 to pull lower portion 252 of pin 238 from out of engagement with the particular secondary hole 242. In this arrangement, pin 238 is moveable laterally in a direction 232 with respect to guide channel 224. By such lateral movement of pin 238, the user can bring lower portion 252 of pin 238 into alignment with another one of secondary holes 242, whereupon pull tab 248 can be released, allowing the spring biasing of flange 256 with respect to lower portion 252 to force lower portion 252 into engagement with such secondary hole 242. In this arrangement, pin 238 is, thereby, retained in another position with respect to slot 230 and first end 226 of guide channel 224 is maintained in the desired position for contact with edge 245 of webbing 244, and corresponding adjustment thereof.

Figure 8:
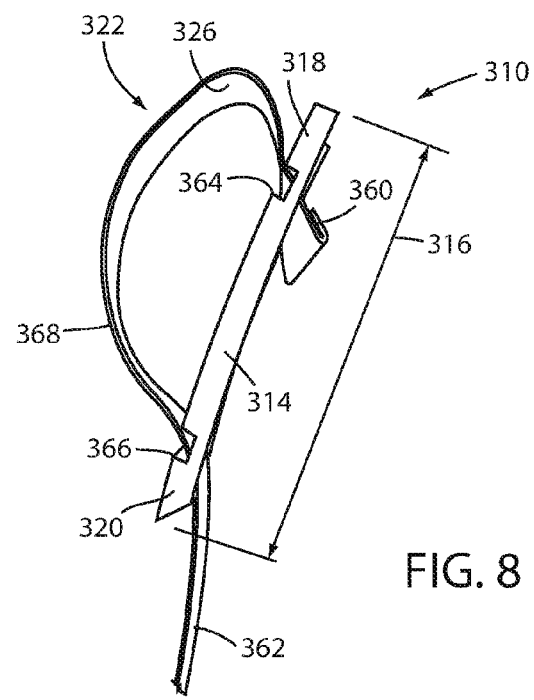
FIG. 8 is a front perspective view of another variation of a webbing guide according to a further aspect of the disclosure.
Figure 9:
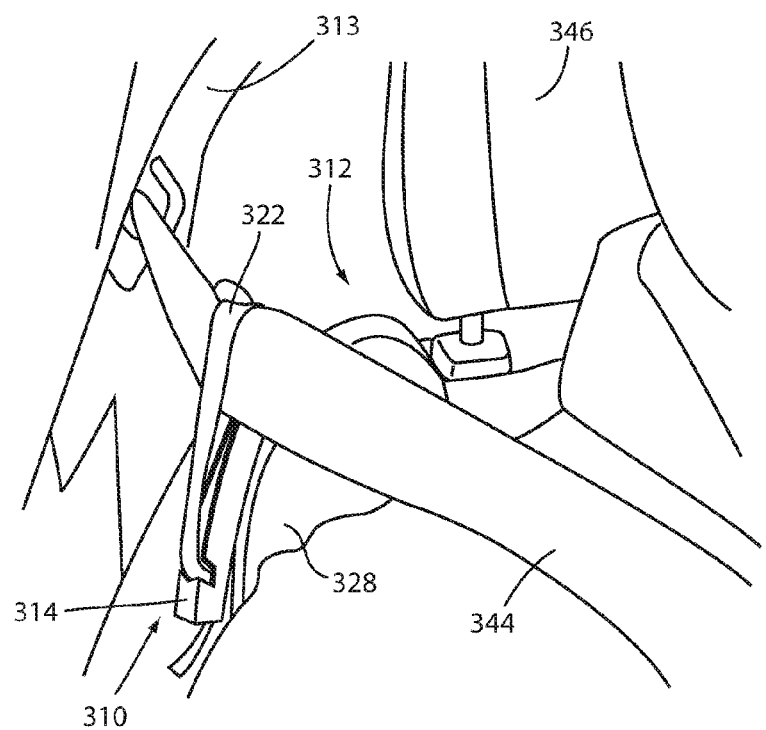
FIG. 9 is a front perspective view of the webbing guide of FIG. 8 coupled with a vehicle seatback and receiving a seatbelt webbing therethrough.
Figure 10:
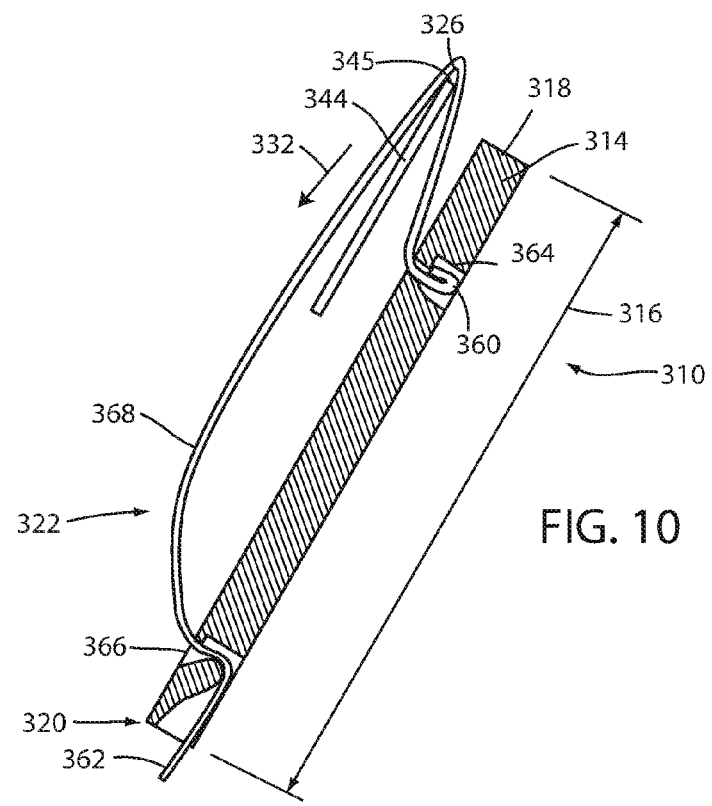
FIG. 10 is a cross-sectional view of the webbing guide of FIG. 8 shown receiving a seatbelt webbing therethrough in a first adjusted position.
Figure 11:
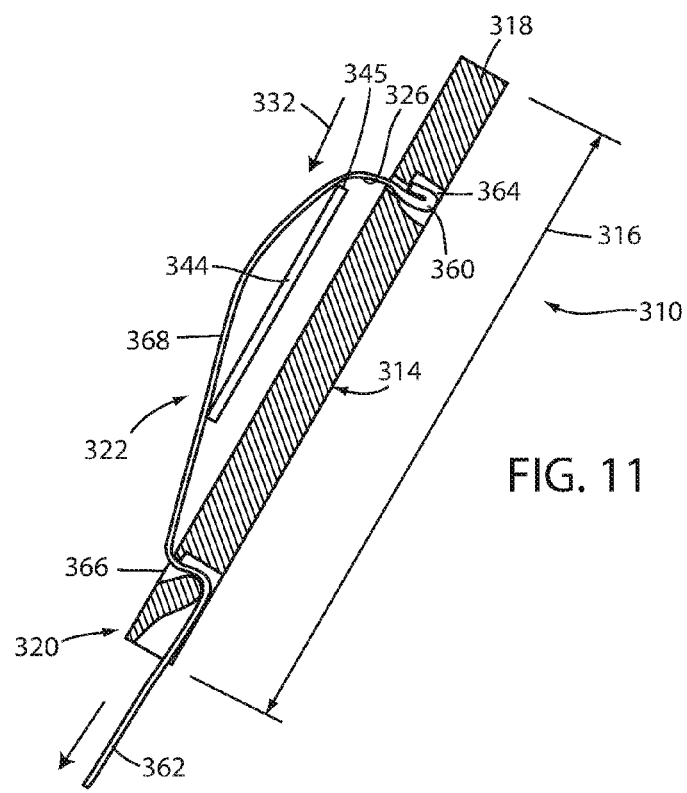
FIG. 11 is a cross-sectional view of the webbing guide of FIG. 8 shown receiving a seatbelt webbing therethrough in a second adjusted position.

A further embodiment of webbing guide 310 is illustrated in FIGS. 8-11. In this embodiment, base 314 is a rigid element configured for attachment to a portion of seatback 328, as illustrated in FIG. 9, adjacent to the path of webbing 344. Further, guide body 322 is provided as a strap, or another section of webbing itself, having a first end 360 generally fixedly coupled to base 314 adjacent the first end 318 thereof. As shown in FIG. 8, as well as in the cross-sectional views of FIGS. 10 and 11, first end 360 of guide body 322 can be fixed with base 314 with engagement of an enlarged or doubled-over portion of the strap at first end 360 into a slot 366 in base 314 having a size greater than the strap itself but smaller than the doubled-over portion at end 360. The opposite second end 362 of guide body 322 can engage with another slot 366 adjacent second end 320 of base 314 that is configured to adjustably receive guide body 322 therein. As depicted in FIGS. 10 and 11, such a slot 366 can be configured in a similar manner to available adjustable couplings for webbings and the like. In this manner, guide body 322 defines an adjustable loop 368 that can be extended, that can be extended, as shown in FIGS. 8-10, and can further be retracted by pulling on end 362, as shown in FIG. 11.

When receiving webbing 344, webbing 344 can pull on guide body 322 to extend the loop 368 away from second end 320 of base 314, including beyond first end 318 thereof as depicted in FIGS. 8-10. In this manner, the first end 326 of guide channel 324 defined through loop 368 can be the upward most portion of loop 368 with which edge 345 engages (or the farthest portion of loop 368 with respect to first end 318). As shown in FIG. 11, when loop 368 is tightened, edge 345 of webbing 344 is urged in direction 332, thereby altering the portion of loop 368 defining first end 326 of guide channel 324, as shown in FIG. 11. Such movement of webbing 344 in direction 332 can serve to adjust the position of webbing 344 with respect to seatback 328 and/or headrest 346, resulting in repositioning thereof with respect to a user occupying seat 312, in a manner similar to that which is discussed above.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A webbing guide for a vehicle seat, comprising:
   a base defining a first end and a second end; and
   a guide body coupled with the base and defining first and second fixed spaced apart long surfaces and a first short surface of a guide channel, the first short surface extending between the first and second spaced apart long surfaces, and the guide channel extending along the base and fully enclosed between the first and second long surfaces, the first short surface disposed in a fixed position adjacent the first end of the base, and a second short surface moveable toward and away from the first end of the base.

2. The webbing guide of claim 1, wherein a seatbelt webbing associated with the vehicle seat is received through the guide channel, a width of the seatbelt webbing extending from adjacent the first short surface to adjacent the second short surface between the first and second long surfaces.

3. The webbing guide of claim 2, wherein the webbing guide is coupled to the vehicle seat such that movement of the second short surface of the guide channel adjusts a position of the webbing with respect to at least a portion of the vehicle seat.

4. The webbing guide of claim 1, wherein the second short surface of the guide channel is defined on a cylindrical pin removeably engaged with a round hole defined in the guide body and open on the first long surface.

5. The webbing guide of claim 4, wherein:
the hole defined in the guide body is one of a plurality of holes distributed along at least a portion thereof in a direction of the length of the base; and
the pin is moveably engaged with the guide body by being selectively removeably engaged with one of the plurality of holes.

6. The webbing guide of claim 4, wherein:
the guide body defines a slot extending along at least a portion thereof in a direction of the length of the base and open on the first long surface; and
the base defines a plurality of holes therein distributed at regular intervals at positions aligned with the slot and open on the second long surface.

7. The webbing guide of claim 6, wherein the pin includes a body defining an upper portion and a lower portion and a flange slidably disposed along the body between the upper portion and the lower portion and biased toward the upper portion, the upper portion of the pin being slidably received in the slot of the guide body and the lower portion of the pin being removeably engaged with one of the plurality of holes such that the pin is moveably engaged with the guide body by removal of the pin from the one of the plurality of holes.

8. The webbing guide of claim 7, wherein the flange is positioned between the guide body and the base such that the biasing of the flange toward the first end of the body of the pin urges the lower portion of the pin into engagement with the one of the plurality of holes.

9. The webbing guide of claim 1, wherein:
the guide body is a strap having an end coupled to the base at the first end of the base and adjustably coupled with the base at a second end of the base so as to define a loop; and
the guide channel is defined by the loop such that a farthest point adjacent to or beyond the first end of the base defines the second short surface of the guide channel with remaining portions of the loop defining the first and second long surfaces.

10. The webbing guide of claim 9, wherein the second end of the guide channel is moveable toward and away from the first end of the body by adjustment of the adjustable coupling of the strap with the base at the second end of the base so as to change a size of the loop.

11. A vehicle seat, comprising:
a seatback; and
webbing guide, including:
a base coupled with the seatback and defining a first end and a second end; and
a guide body coupled with the base and defining first and second spaced apart long surfaces and a first short surface of a guide channel, the first short surface extending between the first and second spaced apart long surfaces, and the guide channel extending along the base between the first short surface being in a fixed position adjacent the first end of the base and a second short surface that is moveable along at least a portion of the length of the base.

12. The vehicle seat of claim 11, wherein a seatbelt webbing associated with the vehicle seat is received through the guide channel, a width of the seatbelt webbing extending from adjacent the first short surface to adjacent the second short surface between the first and second long surfaces.

13. The vehicle seat of claim 12, wherein the webbing guide is coupled to the vehicle seat such that movement of the second short surface of the guide channel adjusts a position of the webbing with respect to at least a portion of the vehicle seat.

14. The vehicle seat of claim 11, wherein the second short surface of the guide channel is defined on a cylindrical pin removeably engaged with a round hole defined in the guide body and open on the first long surface.

15. The vehicle seat of claim 14, wherein:
the hole defined in the guide body is one of a plurality of holes distributed along at least a portion thereof in a direction of the length of the base; and
the pin is moveably engaged with the guide body by being selectively removeably engaged with one of the plurality of holes.

16. The vehicle seat of claim 14, wherein:
the guide body defines a slot extending along at least a portion thereof in a direction of the length of the base and open on the first long surface;
the base defines a plurality of holes therein distributed at regular intervals at positions aligned with the slot and open on the second long surface; and
the pin includes a body defining an upper portion and a lower portion and a flange slidably disposed along the body between the upper portion and the lower portion and biased toward the upper portion, the upper portion of the pin being slidably received in the slot of the guide body and the lower portion of the pin being removeably engaged with one of the plurality of holes such that the pin is moveably engaged with the guide body by removal of the pin from the one of the plurality of holes.

17. The vehicle seat of claim 16, wherein the flange is positioned between the guide body and the base such that the biasing of the flange toward the first end of the body of the pin urges the lower end of the pin into engagement with the one of the plurality of holes.

18. The vehicle seal of claim 11, wherein:
the guide body is a strap having an end coupled to the base at the first end of the base and adjustably coupled with the base at a second end of the base so as to define a loop; and
the guide channel is defined by the loop such that a farthest point adjacent to or beyond the first end of the base defines the second short surface of the guide channel with remaining portions of the loop defining the first and second long surfaces.

19. The vehicle seat of claim 18, wherein the second short surface of the guide channel is moveable toward and away from the first end of the body by adjustment of the adjustable coupling of the strap with the base at the first end of the base so as to change a size of the loop.

20. A vehicle, comprising:
a vehicle seat coupled within the vehicle and including a seatback;
a webbing coupled with the vehicle and associated with the vehicle seat; and
a webbing guide, including:
  a base coupled with the seatback and defining a first end and a second end; and
  a guide body coupled with the base and defining first and second spaced apart long surfaces and a first short surface of a guide channel, the first short surface extending between the first and second spaced apart long surfaces, and the guide channel receiving the webbing therethrough and extending along the base between the first short surface and second short surface, the first short surface of the guide channel being in a fixed position adjacent the first end of the base, and the second short surface of the guide channel being moveable along at least a portion of the length of the base to adjust a position of the webbing with respect to at least a portion of the seatback.

\* \* \* \* \*